(12) United States Patent
Dorst

(10) Patent No.: US 12,055,347 B2
(45) Date of Patent: Aug. 6, 2024

(54) TRANSPORT TROUGH FOR TRANSPORTING AND HEATING OF CHEMICAL SUBSTANCES

(71) Applicant: SAINT-GOBAIN INDUSTRIEKERAMIK RÖDENTAL GMBH, Rödental (DE)

(72) Inventor: Hans-Ulrich Dorst, Rödental (DE)

(73) Assignee: SAINT-GOBAIN INDUSTRIEKERAMIK RÖDENTAL GMBH, Rödental (DE)

( * ) Notice: Subject to any disclaimer, the term of this patent is extended or adjusted under 35 U.S.C. 154(b) by 543 days.

(21) Appl. No.: 17/295,755

(22) PCT Filed: Nov. 21, 2019

(86) PCT No.: PCT/EP2019/082089
§ 371 (c)(1),
(2) Date: May 20, 2021

(87) PCT Pub. No.: WO2020/104592
PCT Pub. Date: May 28, 2020

(65) Prior Publication Data
US 2022/0018601 A1 Jan. 20, 2022

(30) Foreign Application Priority Data
Nov. 21, 2018 (DE) .......................... 102018129272.4

(51) Int. Cl.
*F27D 5/00* (2006.01)
*H01M 4/04* (2006.01)
(Continued)

(52) U.S. Cl.
CPC .... *F27D 5/0068* (2013.01); *F27D 2005/0093* (2013.01); *H01M 4/0471* (2013.01); *H01M 4/1391* (2013.01); *H01M 10/0525* (2013.01)

(58) Field of Classification Search
CPC ........ F27D 5/00; F27D 5/0006; F27D 5/0062; F27D 3/14; F27D 5/0012; F27D 5/0018;
(Continued)

(56) References Cited

U.S. PATENT DOCUMENTS 1,186,490 A * 6/1916 Moorcroft ............. F27D 5/0006
432/258
2,182,201 A * 12/1939 Harris .................. C21D 9/0025
220/684
(Continued)

FOREIGN PATENT DOCUMENTS

| CN | 103591808 A | 2/2014 |
|---|---|---|
| CN | 204235669 U | 4/2015 |

(Continued)

OTHER PUBLICATIONS

KR International Search Report as issued in International Patent Application No. PCT/EP2019/082089, dated Jan. 22, 2020.
(Continued)

*Primary Examiner* — Gregory A Wilson
(74) *Attorney, Agent, or Firm* — Pillsbury Winthrop Shaw Pittman LLP

(57) ABSTRACT

A transport trough, in particular for a continuous furnace for transporting and heating of chemical substances, includes a flat bottom, and a circumferential frame which, together with the bottom, forms a trough-shaped cavity for holding the chemical substances, wherein the frame is connected to the bottom in a non-destructively detachable manner.

15 Claims, 7 Drawing Sheets

Figure 1A:
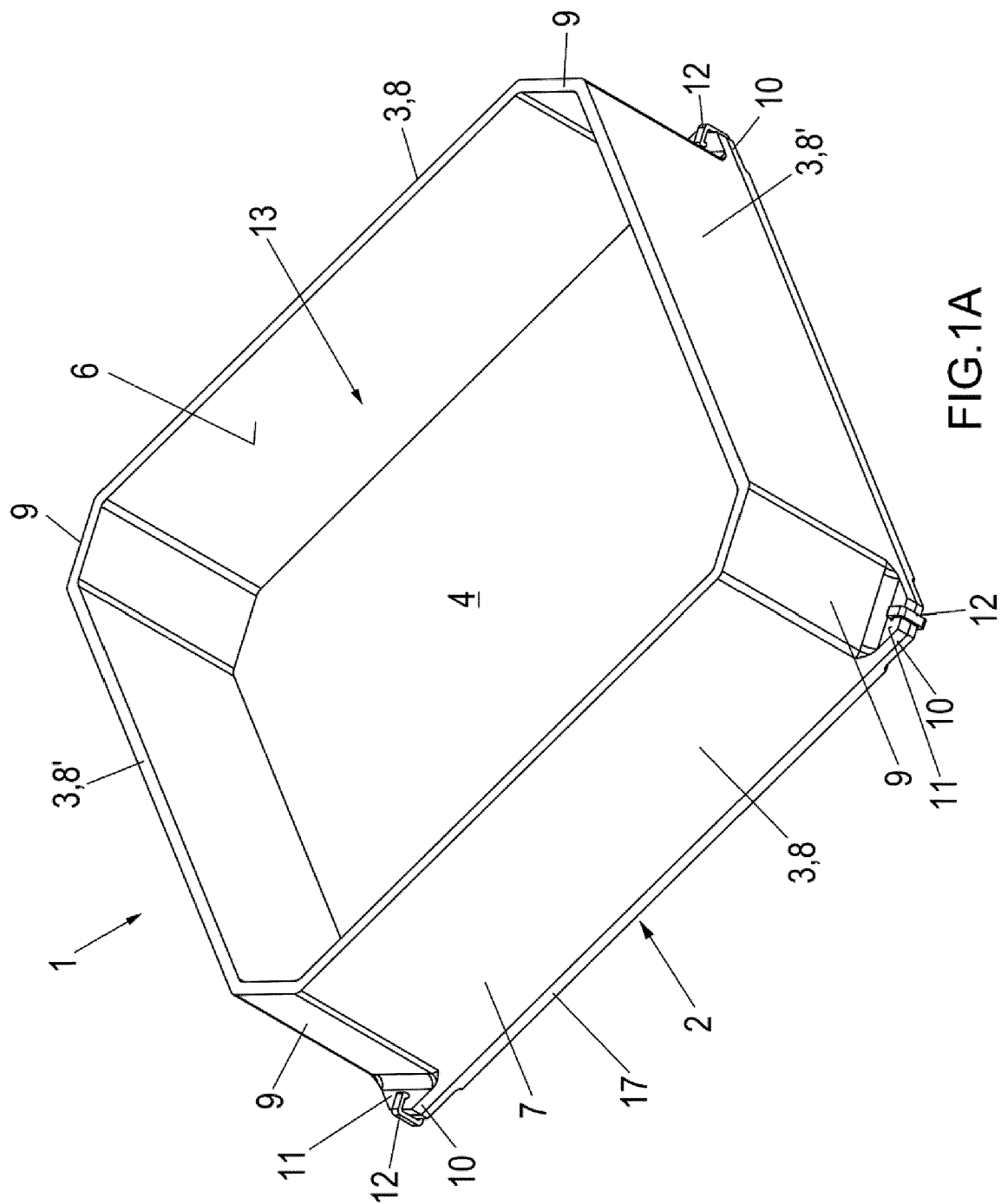

(51) Int. Cl.
  *H01M 4/1391* (2010.01)
  *H01M 10/0525* (2010.01)

(58) Field of Classification Search
  CPC ..... F27D 2005/0075; F27D 2005/0093; F27D 2003/0085; C30B 15/10; F27B 14/10; F27B 2014/102
  See application file for complete search history.

(56) References Cited

U.S. PATENT DOCUMENTS

| | | | | |
|---|---|---|---|---|
| 2,710,746 A | * | 6/1955 | Menough | C21D 9/0025 432/261 |
| 5,900,208 A | * | 5/1999 | Wittmer | F27D 3/12 419/56 |
| 5,935,665 A | * | 8/1999 | Biek | C04B 38/08 428/34.4 |
| 9,714,792 B2 | * | 7/2017 | Sonntag | F27D 5/0012 |
| 11,604,029 B2 | * | 3/2023 | Esfehanian | F27D 5/0018 |
| 2014/0178827 A1 | * | 6/2014 | Na | F27D 5/0068 432/261 |
| 2015/0241127 A1 | | 8/2015 | Sonntag et al. | |

FOREIGN PATENT DOCUMENTS

| | | | | |
|---|---|---|---|---|
| CN | 105352328 A | | 2/2016 | |
| CN | 105841497 A | | 8/2016 | |
| CN | 207159795 U | | 3/2018 | |
| DE | 202014100849 U1 | * | 6/2014 | ........... F27D 3/0021 |
| DE | 102020000510 A1 | * | 7/2021 | ........... F27D 5/0006 |
| GB | 2001155 A | * | 1/1979 | ............. F27B 14/00 |
| JP | S61-197499 U | | 12/1986 | |
| JP | 2002-029857 A | | 1/2002 | |
| JP | 2017-539070 A | | 12/2017 | |
| KR | 920005599 Y1 | * | 8/1992 | |
| KR | 20220043055 A | * | 4/2022 | |
| WO | WO 2007/129391 A1 | | 11/2007 | |
| WO | WO 2012/133525 A1 | | 10/2012 | |

OTHER PUBLICATIONS

Search Report as issued in Chinese Patent Application No. 201980077044.5, dated Jun. 16, 2022.
Notice of Reasons for Rejection as issued in Japanese Patent Application No. 2021-528412, dated Jun. 21, 2022.
Written Decision on Registration as issued in Korean Patent Application No. 10-2021-7018524, dated Feb. 21, 2023.

* cited by examiner

TRANSPORT TROUGH FOR TRANSPORTING AND HEATING OF CHEMICAL SUBSTANCES

CROSS-REFERENCE TO RELATED APPLICATIONS

This application is the U.S. National Stage of PCT/EP2019/082089, filed Nov. 21, 2019, which in turn claims priority to German patent application number 102018129272.4 filed Nov. 21, 2018. The content of these applications are incorporated herein by reference in their entireties.

The present invention is in the technical field of thermal conversion of chemical substances in a furnace and relates to a transport trough suitable for transporting and heating of chemical substances. Furthermore, the invention relates to the use of a transport trough according to the invention in the production of cathode materials for lithium-ion batteries.

Batteries are basically divided into primary and secondary energy storages. While the chemical energy is irreversibly converted into electrical energy in primary energy storages, secondary energy storages (accumulators) allow a multiple use due to the possibility of reversing the chemical reaction by supplying electrical energy. Secondary energy storages with an active cathode material on basis of lithium ions are used in a wide variety of applications. Examples include electric and hybrid vehicles, portable computers, mobile phones and smart watches. Due to the wide-spread use of lithium-ion batteries, active cathode materials are required in large quantities. The quantities produced are more than hundreds of thousands of tons per year worldwide, with a strong upward trend. Currently, it is common to use lithium mixed metal oxides with the transition metals nickel (Ni), manganese (Mn) and cobalt (Co) as the active cathode material. The most commonly produced cathode materials are lithium nickel cobalt manganese oxide ($LiNiCoMnO_2$) and lithium cobalt oxide ($LiCoO_2$); lithium nickel cobalt aluminum oxide ($LiNiCoAlO_2$) and lithium iron phosphate ($LiFePO_4$) are produced in smaller quantities.

In the large-scale production of cathode materials for lithium-ion batteries, the respective starting materials are transported in a transport trough through a continuous furnace and heated to a temperature of, for example, several hundred degrees Celsius, which results in a chemical conversion to the desired product. In practice, it has been shown that the transport troughs are subject to considerable corrosion. The reason for this is the chemical aggressiveness of the substances transported in the transport trough, which increasingly attack the material of the transport trough at the high temperatures in the continuous furnace. Particularly in the production of lithium nickel cobalt manganese oxide, very strong corrosion of the transport trough occurs due to the particularly aggressive transition metals. This has the disadvantage that the transport trough can only be used for a relatively small number of times and must then be replaced. For example, a transport trough can usually only be used for 20 to 40 production cycles in the production of lithium nickel cobalt manganese oxide. Another complicating factor is that the transport troughs contain residues of the cathode powder after use, which are generally classified as hazardous waste, so that expensive and time-consuming disposal is required. On the one hand, this increases the production costs for the active cathode material in an undesirable manner, and on the other hand, the hazardous waste resulting from the transport troughs to be disposed of is undesirable from an ecological point of view. In addition, materials from the transport trough contaminate the cathode powder, which leads to its contamination and reduces its overall quality.

In contrast, the object of the present invention is to improve transport troughs fora continuous furnace known in the prior art in such a way that the costs for the large-scale production of chemical products are reduced and less hazardous waste has to be disposed of. In addition, there should be less contamination of the cathode powder by the trough material.

These and further objects are solved according to the proposal of the invention by a transport trough for a furnace, in particular a continuous furnace or a hearth wagon furnace, according to the features of the independent claim. Advantageous embodiments of the invention are indicated by the features of the subclaims.

According to the invention, a transport trough fora furnace, in particular a continuous furnace or a hearth wagon furnace, is shown. The transport trough serves as a tub-shaped container for transporting chemical substances, whereby the substances transported in the transport trough (starting materials) are to be converted into a chemical product by heating in the furnace in the transport trough. In principle, any starting materials can be converted into a chemical product in the transport trough according to the invention. Particularly advantageous are starting materials for the production of an active cathode material of a lithium-ion battery, which is in particular a lithium mixed metal oxide with the transition metals nickel (Ni), manganese (Mn) and cobalt (Co), described by the general formula $LiNi_xMn_yCo_zO_2$ with $x+y+z=1$. In the above formula, nickel, manganese and cobalt can each be present alone or in any combination thereof.

The transport trough generally comprises a bottom which is flat at least inside the transport trough, and a circumferential frame which, together with the bottom, forms a trough-shaped (i.e. upwardly open) cavity for receiving chemical substances. Here, the frame is connected to the bottom in a non-destructively detachable manner. The bottom is positively and/or non-positively connected to the frame, whereby the bottom can be removed from the frame without destroying the bottom and frame. The bottom and the circumferential frame each have surfaces which delimit the trough-shaped cavity, whereby the bottom surface serves to support the chemical substances.

As the inventor has surprisingly found, during the thermally induced conversion of the starting materials in the transport trough, there is usually more corrosion on the bottom than on the frame. The reason for this is a slight shrinkage of the substances transported in the transport trough, which, depending on the temperature, leads to reduced or even no contact with the inside frame surface, resulting in less (contact) corrosion. The transport trough according to the invention makes use of this knowledge in an advantageous manner and, due to the detachable fastening of the bottom and the frame, enables the replacement of the possibly more corroded bottom or a part of the bottom and a further use of the frame. In addition, the bottom detached from the frame can be subjected to selective cleaning, for example by sandblasting, which may also enable further use. This can save costs f or the transport troughs, thereby saving overall costs for the large-scale production of a product, in particular the active cathode material of a lithium-ion battery. In addition, the amount of hazardous waste to be disposed of is reduced.

To achieve a non-destructively detachable but firm connection between frame and bottom, the frame and bottom are, e.g., clamped or screwed together, with at least one corresponding connecting means (clamping element, screwing element) being provided. In the case of a screw connection, it can be advantageous if screws are accommodated in a thread with play. This can be advantageous with regard to different thermal expansions of bottom and frame, which can be compensated by the play between screw and thread.

The bottom of the transport trough according to the invention can basically be formed in one-piece or multi-part. The bottom can consist of a single bottom plate, the (single) bottom plate having a bottom surface which delimits the trough-shaped cavity and serves to support the chemical substances. Alternatively, the bottom may consist of a plurality of bottom plates arranged one above the other (in vertical direction). Each bottom plate can be formed in one-piece or composed of a plurality of bottom plate elements. The uppermost bottom plate has a bottom surface which delimits the trough-shaped cavity and serves to support the chemical substances.

According to an advantageous embodiment of the transport trough according to the invention, the closed frame has an outwardly protruding clamping flange (in the direction away from the cavity of the transport trough). Particularly preferably, the bottom is firmly connected to the clamping flange of the frame by at least one clamping element.

According to an advantageous embodiment of the transport trough according to the invention, the closed frame has on its underside a support flange protruding inwardly (in the direction of the cavity of the transport trough), which is preferably formed circumferentially. Particularly preferably, the frame is firmly connected through the support flange to the bottom placed on the support flange by at least one screw element. The support flange is here also a screw flange, since it serves for screwing. Particularly preferably, the at least one screw element which passes through the support flange ends blindly in a threaded blind hole (i.e. hole which does not completely penetrate the bottom) which is formed in the bottom.

According to an advantageous embodiment of the transport trough according to the invention, the bottom is in the form of a one-piece bottom plate, i.e. the bottom consists of the one-piece bottom plate. Preferably, the one-piece bottom plate is firmly connected to the frame by at least one non-destructively detachable connecting means (e.g. clamping element, screw element). For example, the one-piece bottom plate is firmly connected to the frame by at least one screw element, for which purpose the bottom plate is advantageously placed on the inwardly protruding support flange or screw flange. Alternatively, the one-piece bottom plate is firmly connected to the frame by at least one clamping element, wherein the at least one clamping element preferably engages the clamping flange of the frame.

According to an advantageous embodiment of the invention, the bottom consists of two bottom plates arranged one above another, so that an upper bottom plate is arranged on a lower bottom plate. The upper bottom plate is composed of a plurality of, for example, strip-shaped bottom plate elements, and the lower bottom plate is formed in one-piece. The strip-shaped bottom plate elements are preferably arranged adjacent to each other. Particularly preferably, the one-piece lower bottom plate, as well as optionally the upper bottom plate, is firmly connected to the frame by at least one clamping element, for which purpose the frame advantageously has an outwardly protruding clamping flange. Clamping takes place by means of at least one clamping element that engages the clamping flange. If the frame is corroded, the upper bottom plate or individual bottom plate elements, as well as the lower bottom plate if necessary, can be replaced. If necessary, individual bottom plate elements of the upper bottom plate and/or the one-piece lower bottom plate can be reused, for example after cleaning.

According to a further embodiment of the invention, the bottom comprises a bottom plate which is composed of a plurality of, for example, strip-shaped bottom plate elements which are arranged adjacent to each other. Preferably, the frame has an inwardly protruding support flange on which the strip-shaped bottom plate elements rest. Preferably, at least one clamping element, for example a clamping strip, is provided to firmly connect the strip-shaped bottom plate elements to the frame, wherein the clamping element is screwed to the support flange (screw flange). For this purpose, at least one screw element is used, which passes through the support flange and ends in a blind hole provided with a threaded hole, which is formed in a bottom plate element. For example, only the two outermost bottom plate elements are screwed and the bottom plate elements further inwards are clamped by at least one clamping strip, preferably two clamping strips. Two clamping strips arranged opposite to one another are advantageous. This embodiment also allows the entire bottom plate or individual bottom plate elements to be replaced easily, wherein individual bottom plate elements can still be used if necessary.

In an exemplary embodiment of the transport trough, the frame has a rectangular or square shape with two opposing (parallel) frame sections in each case. Advantageously, adjacent frame sections are connected to each other by an inclined corner (frame) section, wherein the corner section is arranged at an angle of greater than 0° and less than 90° to each of the two adjacent frame sections. For clamping the frame and the bottom, it is advantageous if the frame has a separate clamping flange at each corner section, wherein the corner section can be offset inwardly relative to the frame sections, for example.

For clamping the frame and the bottom, it is generally advantageous if the frame has one or more clamping flanges. The clamping flanges can be used to attach a separate clamping element. However, it is also possible that a common clamping element is provided for all clamping flanges.

Advantageously, the frame is screwed to the bottom, i.e. frame and bottom are firmly connected by at least one screw connection. Like the clamp connection, the screw connection is on the one hand a permanently fixed connection, but on the other hand allows the bottom and frame to be quickly and easily detached from each other without being destroyed.

Advantageously, the frame has at least one screw flange for this purpose, which is formed in such a way that the bottom can be placed on the screw flange through the frame as an insert. Preferably, one or more blind holes, which do not break through the bottom, are formed below the cavity for a screw connection of frame and bottom. The blind holes are each provided with a thread for engaging a fastening screw. It is possible to insert a threaded sleeve in each blind hole. Blind holes can advantageously prevent damage to the bottom surface of the cavity. In addition, the screws are reliably protected against corrosion. In addition, the (flat) inner bottom surface can be easily cleaned, for example by sandblasting.

Typically, the transport trough is made of a fireproof material. Preferably, the frame and bottom are made of a ceramic material, which is preferably selected from the group consisting of cordierite, mullite, alumina, SiC, or mixtures thereof. Aluminum oxide/cordierite/spinel mixtures are common. Preferably, the frame and bottom are made of a SiC material, such as Si—SiC, in particular a porous SiC material, such as N—SiC and R—SiC, preferably silicon nitride, silicon oxynitride, or mixtures thereof. Due to the design-related improved resistance to temperature changes compared to conventional "rigid" transport troughs, the frame and/or bottom can also consist of $Al_2O_3$-rich materials.

The non-destructively detachable connection between the bottom and the frame also enables them to be manufactured from different materials in an advantageous manner. According to an advantageous embodiment of the transport trough according to the invention, the bottom and the frame are made of different materials, which are preferably selected in such a way that the material of the bottom is more corrosion-resistant than the material of the frame with respect to the chemical conversion to the same product. The transport trough can thus be used more frequently, i.e. the number of production cycles until replacement due to corrosion is increased. In particular, the material of the bottom can be selected specifically with respect to corrosion stability during the conversion of certain starting materials to a chemical product, thereby increasing the number of cycles. If the more corrosion resistant material of the bottom is more expensive, the increased cost is only for the bottom and not for the frame, so that, compared to the complete production of the transport trough from the more expensive material, the cost for the transport trough is lower. However, it is also possible that the bottom and frame of the transport trough according to the invention are made of the same material. A cost saving in the large-scale production of a chemical product can be achieved by replacing only the more corroded bottom or parts of the bottom and reusing the frame.

According to an advantageous embodiment of the invention, the bottom (and optionally also the frame) consists of a material that is particularly corrosion resistant with regard to the production of active cathode materials based on lithium ions, which material is preferably selected from the group consisting of aluminum oxide, zirconium oxide, magnesium oxide, R-SiC, N-SiC, S-SiC and Si-SiC, or mixtures thereof. The frame (and optionally also the bottom) is preferably made of aluminum oxide, R-SiC, N-SiC, S-SiC or Si-SiC, or a less corrosion-resistant but less expensive material such as SiC (oxide- or nitride-bonded), cordierite or cordierite/spinel/mullite mixture.

In principle, the transport trough according to the invention can be used for the production of any chemical product in which the transport trough is transported through a furnace, in particular a continuous furnace, and the starting materials in the transport trough are chemically converted by heating in the furnace. Particularly advantageously, the transport trough is used in the production of a (lithium-ion-based) active cathode material of a lithium-ion battery. The invention extends to the use of the transport trough according to the invention for the production of a cathode material of a lithium-ion battery, in particular a lithium mixed metal oxide with the transition metals nickel (Ni), manganese (Mn) and cobalt (Co), described by the general formula $LiNi_xMn_yCo_zO_2$ with $x+y+z=1$.

The various embodiments of the invention can be realized individually or in arbitrary combinations. In particular, the features mentioned above and to be explained below can be used not only in the combinations indicated, but also in other combinations or alone, without leaving the scope of the present invention.

Figure 1B:
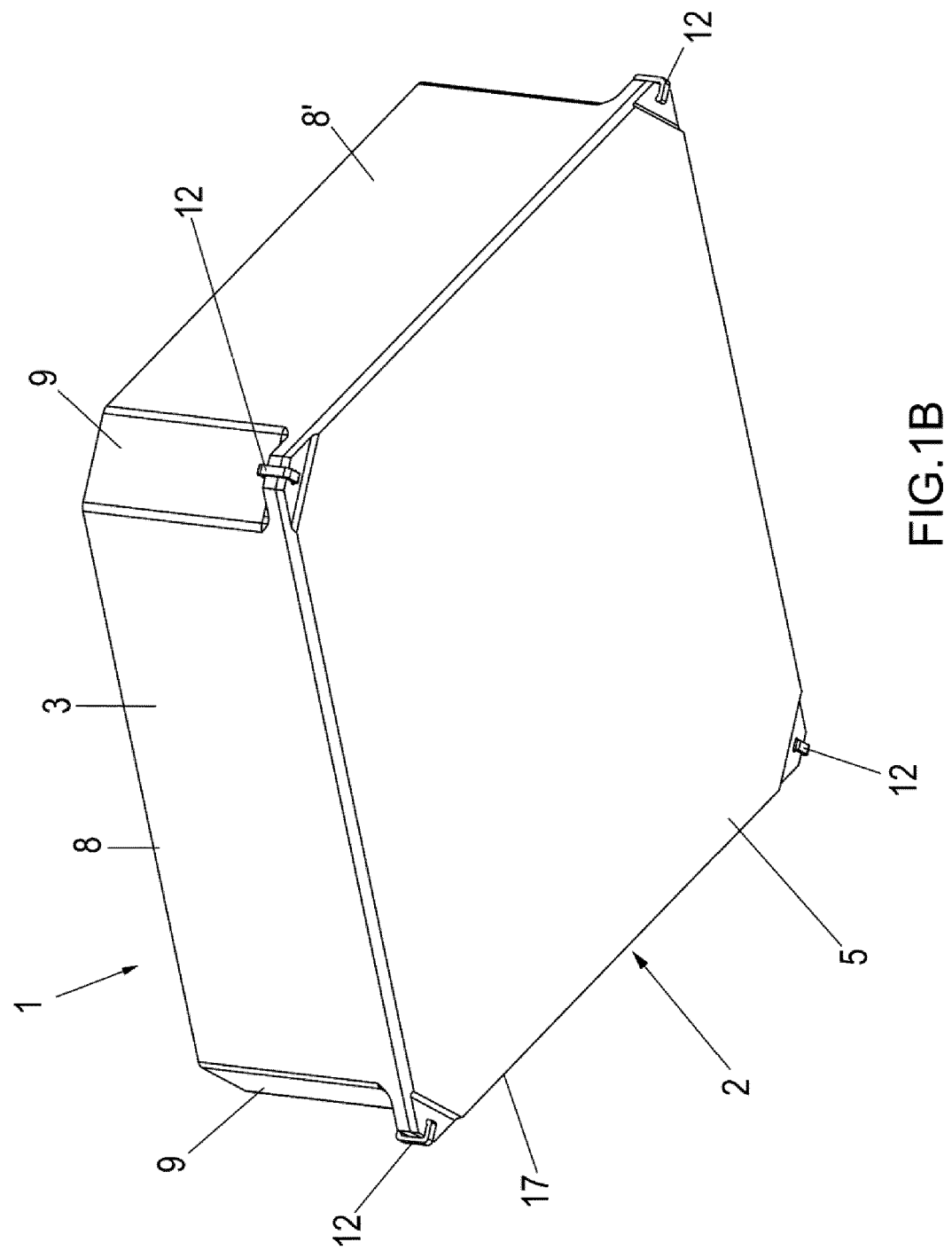

The invention will now be explained in more detail by exemplary embodiments, wherein reference is made to the accompanying figures. They depict in simplified, not to scale representation:

FIGS. 1A-1B various views of an embodiment of the transport trough according to the invention;

FIG. 2A-2D various views of a further embodiment of the transport trough according to the invention;

FIG. 3A-3D various views of a further embodiment of the transport trough according to the invention;

FIG. 4A-4D various views of a further embodiment of the transport trough according to the invention;

DETAILED DESCRIPTION OF THE FIGURES

Reference is first made to FIGS. 1A and 1B. FIG. 1A shows a transport trough, denoted in total by the reference number 1, according to a first embodiment of the invention in a perspective view from above. FIG. 1B shows the transport trough 1 in a perspective view from below. The transport trough 1 is used for the transport and heating of chemical substances, here for example, in a continuous furnace. Typically, a continuous furnace comprises a roller bed with actively driven rollers, which together form a transport surface for supporting and transporting the transport trough from a furnace entrance to a furnace exit.

Since the actual structure of a continuous furnace is not necessary for understanding the invention, it is not necessary to describe it.

The transport trough 1 comprises a bottom 2, which here consists of a flat, one-piece bottom plate 17. The bottom plate 17 has a front-side (upper) bottom surface 4 and a rear-side (lower) bottom surface 5. A circumferential, closed frame 3 is placed on the front-side bottom surface 4. The frame 3 is essentially rectangular in shape and comprises two opposing (parallel) frame sections 8 and 8' respectively, which are connected to one another by inclined corner sections 9. The corner sections 9 are each set back inwards towards the corners of the bottom 2. The frame 3 can be formed in one-piece or multi-part. For example, the frame sections 8, 8' are detachably or non-detachably connected to one another by the corner sections 9.

The frame 3 has an inside frame surface 6 and an outside frame surface 7. The front-side bottom surface 4 and the inside frame surface 6 together delimit an upwardly open, trough-shaped cavity 13, which is used to receive starting materials that are to be converted into a chemical product by heating in the continuous furnace. For this purpose, the transport trough 1 is transported through a continuous furnace on the rear-side bottom surface 5.

The frame 3 is detachably but firmly connected to the bottom plate 17. For this purpose, the frame 3 has a clamping flange 10 at each of the inwardly offset corner sections 9. The clamping flanges 10 each protrude outwardly from the corner sections 9. Each clamping flange 10 has a top clamping surface 11 facing away from the rear-side bottom surface 5. A spring-elastic clamp 12 of ceramic material serving as a clamping element is clamped between the clamping surface 11 and the rear-side bottom surface 5, so that the bottom plate 17 and the frame 3 are pressed together by the spring-elastic force of the clamp 12. This results in a permanently fixed connection between the bottom plate 17 and the frame 3. The clamps 12 have, e.g., a U-shape and can be attached or removed in a simple manner to firmly connect or disconnect the frame 3 and the bottom plate 17. The clamps are typically provided with a device (nose) so that they remain permanently in a locked state, which is not shown in more detail. Clamping at the four corner sections 9 ensures a permanently secure connection of frame 3 and bottom plate 17.

The frame 3 and the bottom plate 17 can be made of different materials, wherein the bottom plate 17 is advantageously made of a material that is more corrosion resistant than the material of the frame 3 with respect to the chemical conversion of the same product. For example, the bottom plate 17 is made of a material selected from the group consisting of aluminum oxide, zirconium oxide, magnesium oxide, R-SiC, N-SiC, S-SiC and Si-SiC, or mixtures thereof. For example, the frame 3 is made of cordierite or a cordierite/spinel/mullite mixture. However, it is also possible that the frame 3 and the bottom 2 are made of the same material.

Advantageously, the transport trough 1 is used for the production of an active cathode material of a lithium-ion battery, in particular a lithium mixed metal oxide with the transition metals nickel (Ni), manganese (Mn) and cobalt (Co), described by the general formula $LiNi_xMn_yCo_zO_2$ with $x+y+z=1$. However, it would also be conceivable to use the transport trough 1 for the production of other substances, for example color pigments.

In addition to the option of manufacturing the frame 3 and the bottom plate 17 from the same or different materials, their detachable assembly also allows an easy replacement of the typically more corroded bottom plate 17. Thus, the bottom plate 17 can be detached from frame 3 in a simple manner by pulling off the clamps 12 and replaced, wherein the frame 3 can be further used with a new bottom plate 17. This can save costs and material. Similarly, simple cleaning of the front-side bottom surface 4 is possible, for example by sandblasting.

Reference is now made to FIGS. 2A to 2D, in which a further embodiment of the transport trough 1 according to the invention is illustrated by means of various views. In order to avoid unnecessary repetitions, only the differences from the first embodiment are described and otherwise reference is made to the above explanations.

Figure 2A:
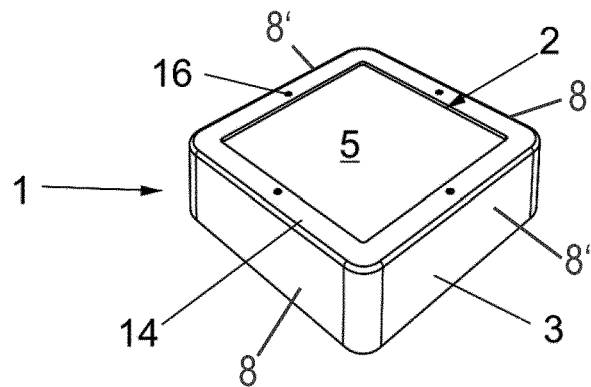
Figure 2B:
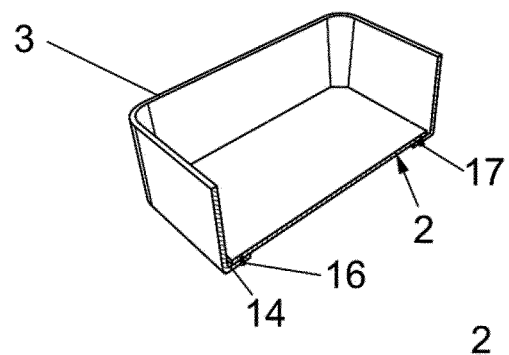

First, consider FIG. 2A, in which the rear side of the transport trough 1 is shown in a perspective view. Accordingly, the frame 3 has a circumferential screw flange 14 on its underside, which protrudes inwards. As shown in FIG. 2B, a perspective view obliquely from above of the transport trough 1, the bottom 2, which is formed in the form of a one-piece bottom plate 17, is placed with its rear-side bottom surface 5 in the form of an insert onto the screw flange 14 from above. The frame 3 and the bottom plate 17 are firmly connected by respective screw connections on the frame 3.

Figure 2C:
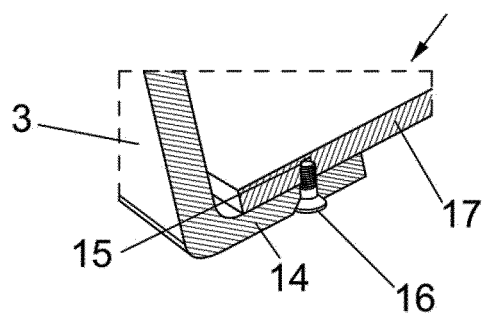
Figure 2D:
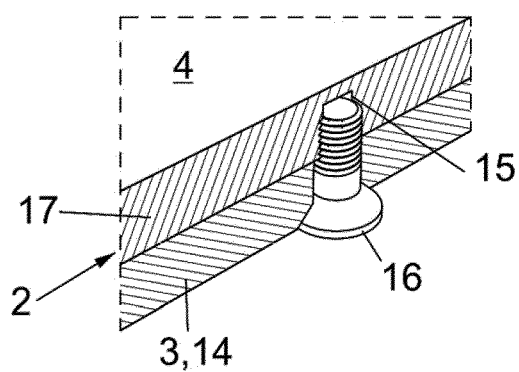

The screw connection is shown enlarged in FIG. 2C and FIG. 2D in respective sectional views. Accordingly, a blind-ending blind hole 15 is drilled from below for each frame section 8, 8', which traverses the screw flange 14 but does not break through the bottom plate 17, so that the front-side bottom surface 4 remains undamaged. The blind hole 15 is provided with a screw thread, not shown in detail, which is screwed with a screw 16. The screw thread may be screwed into the blind hole 15. Alternatively, a threaded sleeve may be inserted into the blind hole 15. By screwing in or loosening the screws 16, the frame 3 and the bottom plate 17 can be firmly connected or disconnected in a simple manner. Preferably, the screws 16 are received with play in the thread so that the play can accommodate various thermal expansions of the bottom plate 17 and frame 3. This also allows the use of materials whose coefficient of thermal expansion differs significantly.

Figure 3A:
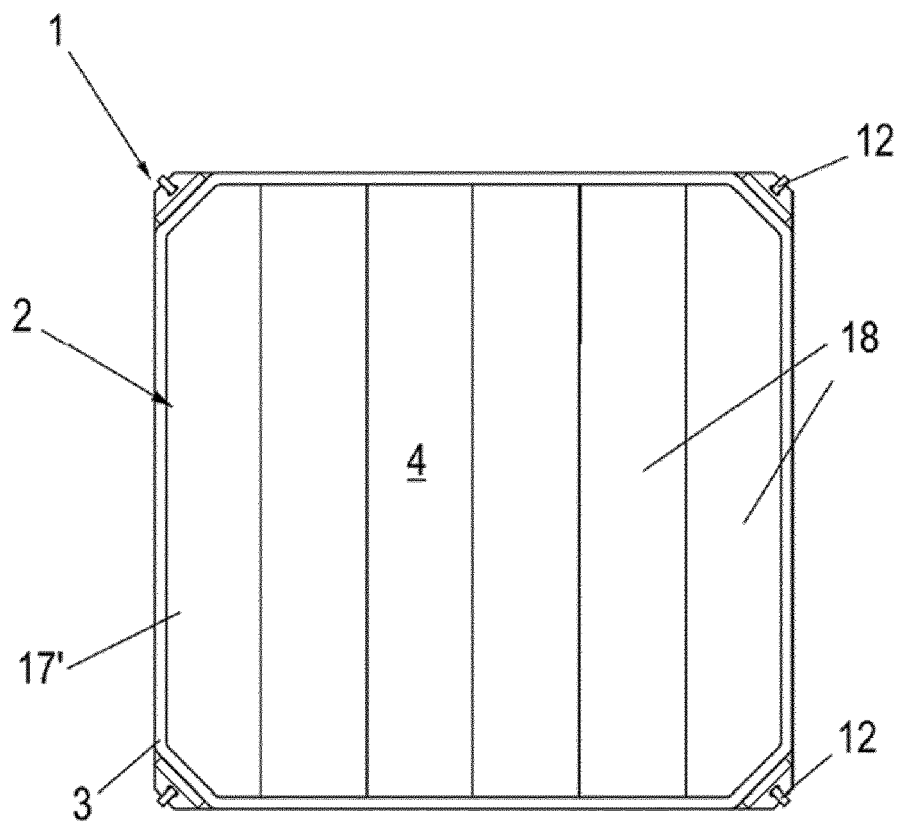
Figure 3B:
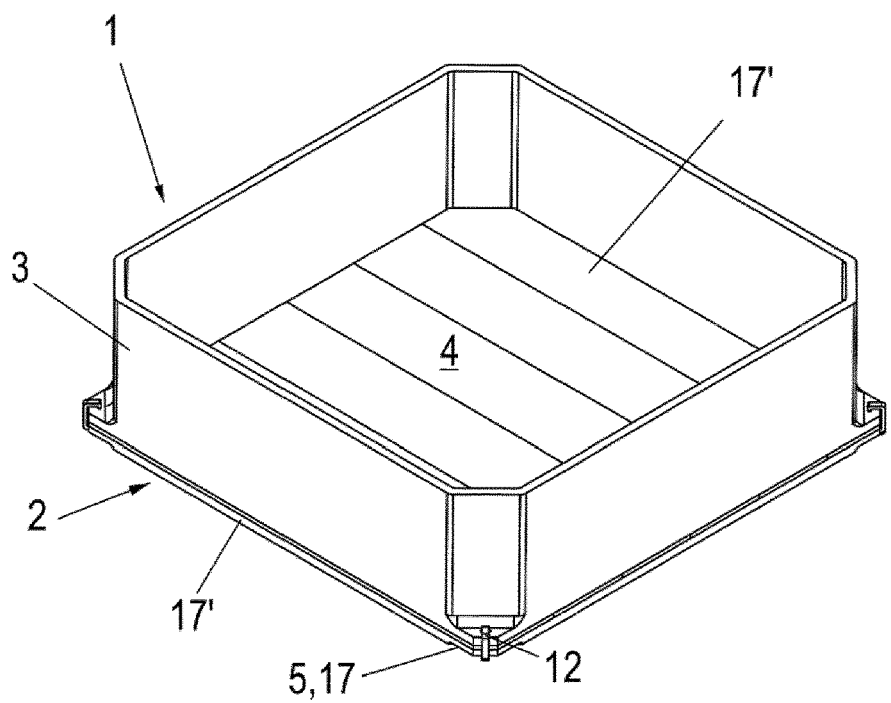
Figure 3C:
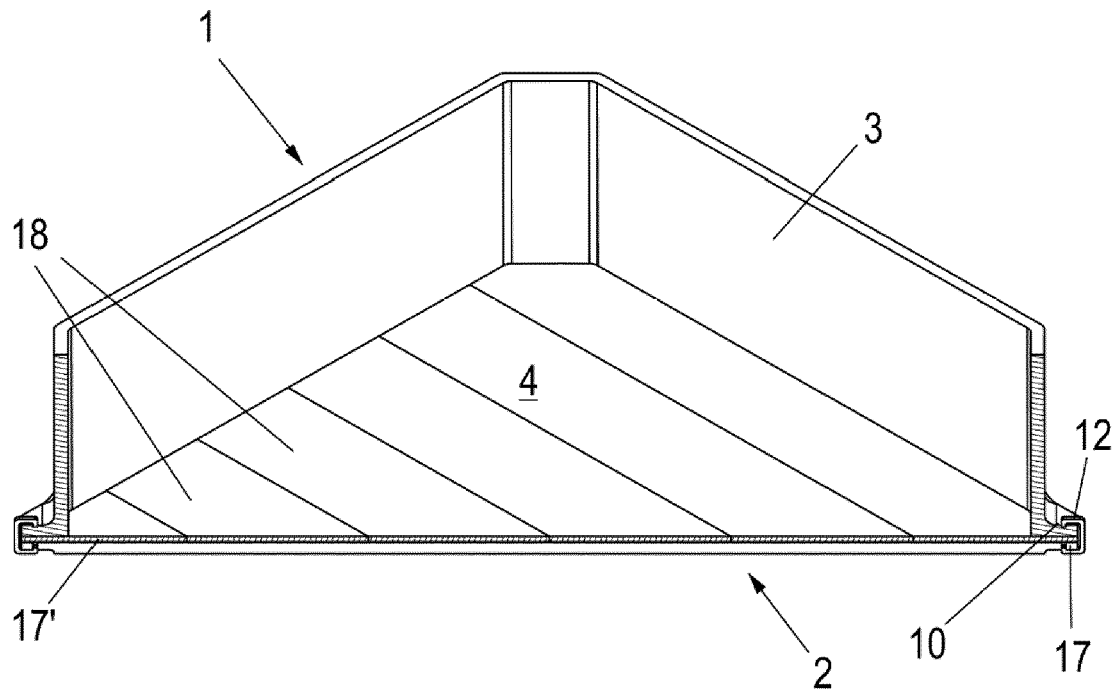
Figure 3D:
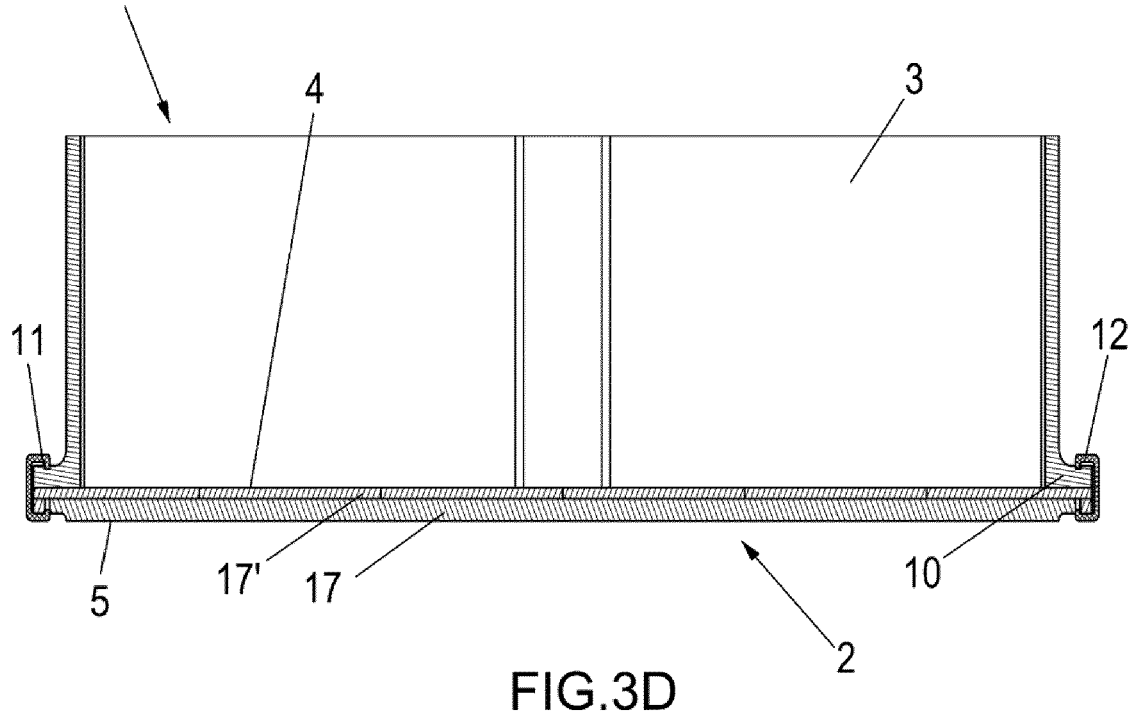

Reference is now made to FIGS. 3A to 3D, wherein a further embodiment of the transport trough 1 according to the invention is illustrated by means of various views. In order to avoid unnecessary repetitions, only the differences to the first embodiment are described and otherwise reference is made to the above explanations. FIGS. 3A and 3B show the upper side of the transport trough 1 in a top view and a perspective view, FIG. 3C and FIG. 3D each show sectional views.

In this embodiment, the bottom 2 consists of a one-piece lower bottom plate 17 and a multi-part upper bottom plate 17' arranged thereon. The upper bottom plate 17' is formed of a plurality of strip-shaped bottom plate elements 18 which are arranged loosely adjacent to each other. The upper bottom plate 17' is gap-free, i.e. the strip-shaped bottom plate elements 18 lie against each other without intermediate joints. The front-side bottom surface 4 is formed by the upper bottom plate 17'. Both bottom plates 17, 17' are clamped to the frame 3, for which purpose the clamps 12 clamp the upper-side clamping surface 11 and the rear-side bottom surface 5 formed by the bottom plate 17. The two bottom plates 17, 17' are made of different materials. Advantageously, the upper bottom plate 17' is made of a material which, in terms of chemical conversion of the same product, is more corrosion resistant than the material of the lower bottom plate 17, thus saving costs. The multi-part design of the upper bottom plate 17 makes it possible to replace individual bottom plate elements 18 in a simple manner. Similarly, the upper bottom plate 17' or the lower bottom plate 17 can be replaced separately. The multi-part design (strips) increases the resistance to temperature changes of the bottom plate 17' and permits the use of dense, corrosion-resistant materials which would not withstand the temperature change load if designed as a solid plate.

Figure 4A:
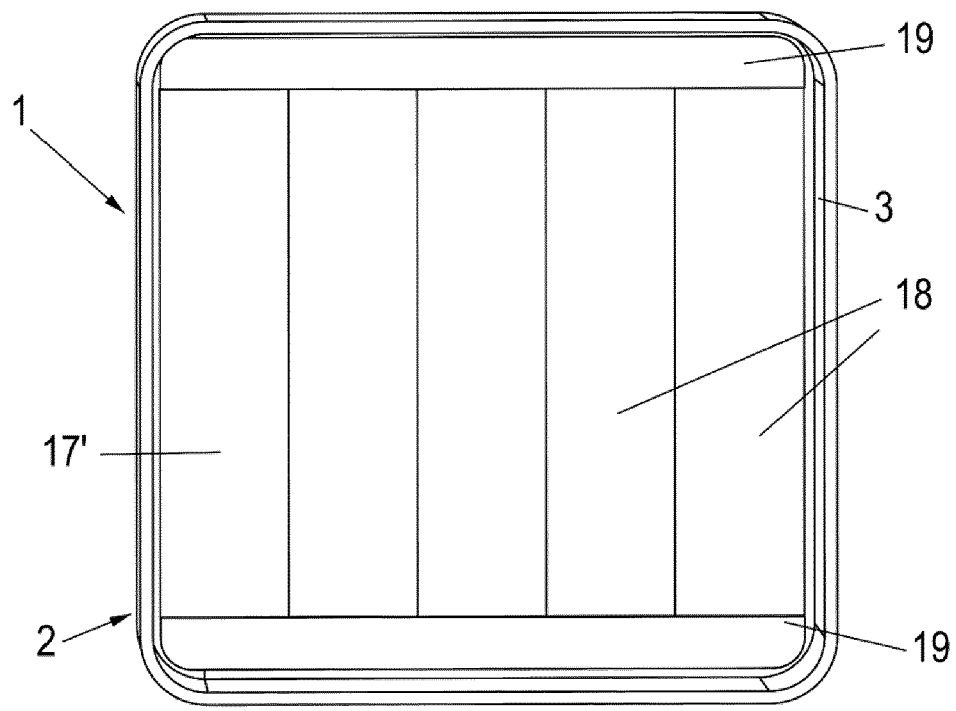
Figure 4B:
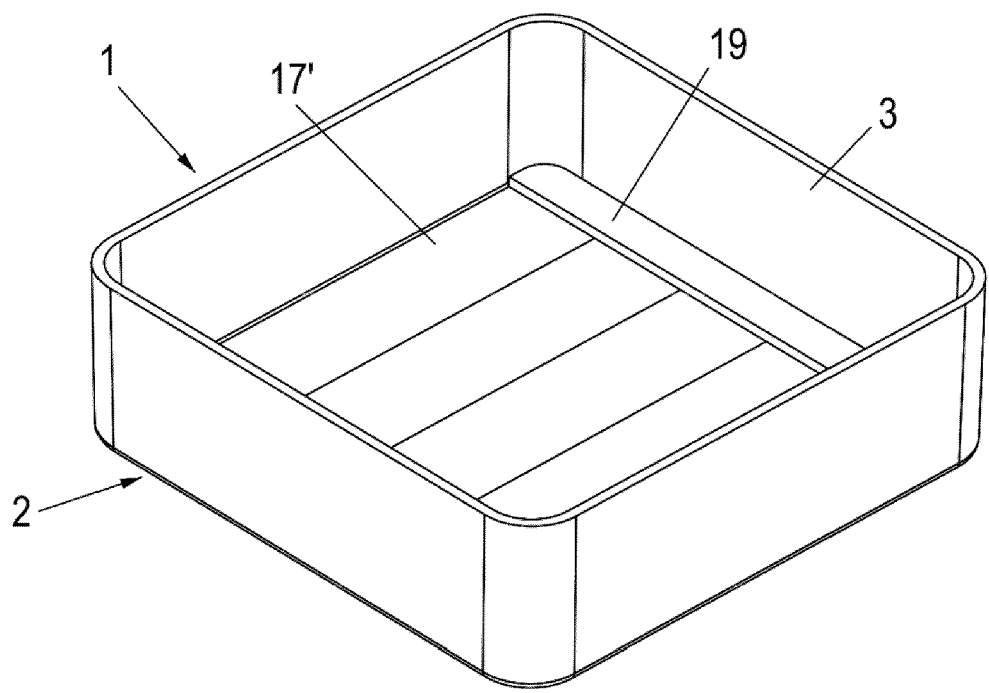
Figure 4C:
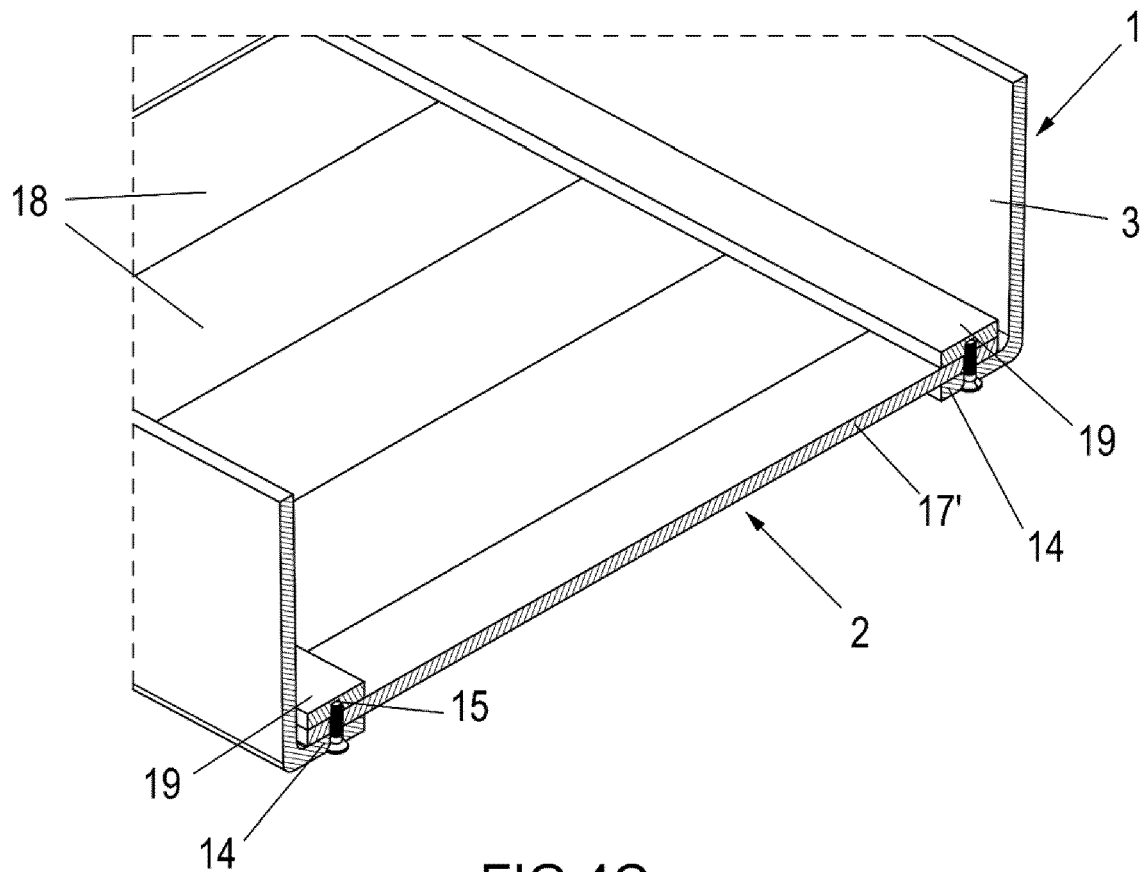
Figure 4D:
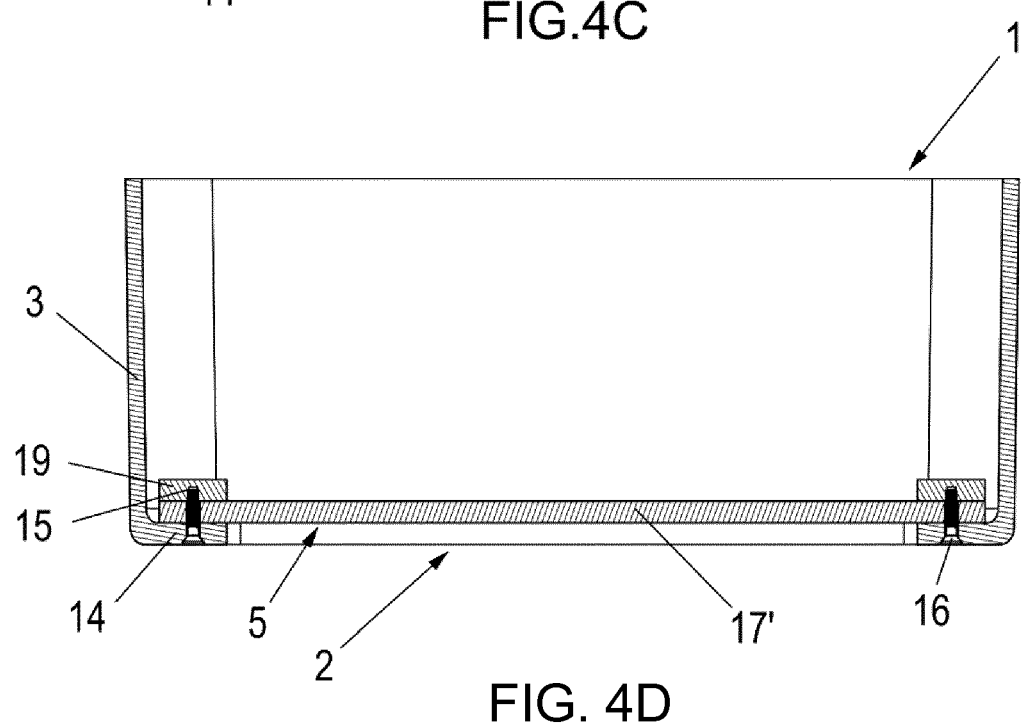

Reference is now made to FIGS. 4A to 4D, wherein a fourth embodiment of the transport trough 1 according to the invention is illustrated by means of various perspective views. In order to avoid unnecessary repetitions, only the differences to the second embodiment are described and otherwise reference is made to the above explanations. FIGS. 4A and 4B show the upper side of the transport trough 1 in a top view and a perspective view, FIGS. 4C and 4D each show sectional views.

Accordingly, the frame 3 has a circumferential screw flange 14 which protrudes inwards. The bottom 2, which consists of a multi-part bottom plate 17', is placed with its rear-side bottom surface 5 in the form of an insert on the screw flange 14 from above. The bottom plate 17' is composed of a plurality of strip-shaped bottom plate elements 18, which are arranged loosely adjacent to each other. The bottom plate 17' is gap-free, i.e. the strip-shaped bottom plate elements 18 lie against each other without intermediate joints. The frame 3 and the bottom plate 17' are firmly connected by screw connections, for which purpose blind-ended blind holes 15 are drilled in clamping strips 19 from below. Screws 16 pass through the screw flange 14 and the bottom plate 17' and end in the clamping strips 19. A fixed connection of the two outermost bottom plate elements 18 to the frame is made by the screw connection. The bottom plate elements 18 are clamped against the screw flange 14 by the clamping strips 19. In the embodiment shown, the transport trough 1 has two parallel clamping strips 19 facing each other. In turn, the multi-part nature of the bottom plate 17' allows individual bottom plate elements 18 or the entire bottom plate 17' to be replaced in a simple manner. Preferably, the screws 16 are threaded with play so that the play can accommodate different thermal expansions of the bottom plate elements 18 and frame 3. This also allows the use of materials whose coefficient of thermal expansion differs significantly.

From the above, it follows that the invention provides an improved transport trough for the transport and heating of chemical substances. The detachable but firm connection of frame and bottom allows easy replacement and cleaning of the usually more corroded bottom or parts thereof. In addition, the frame and bottom can be made of different materials. Due to the overall lower costs for the transport trough, the costs for the large-scale production of chemical products can be reduced. This is especially true for the production of active cathode materials for lithium-ion batteries. Similarly, the hazardous waste generated by the corrosion-damaged transport trough can be reduced. In addition, the quality of the cathode material can be improved.

LIST OF REFERENCE CHARACTERS 1 transport trough
2 bottom
3 frame
4 front-side bottom surface
5 rear-side bottom surface
6 inside frame surface
7 outside frame surface
8, 8' frame section
9 corner section
10 clamping flange
11 clamping surface
12 clamp
13 cavity
14 screw flange
15 blind hole
16 screw
17. 17'bottom plate
18 bottom plate element
19 clamping strip

The invention claimed is:

1. A transport trough for transporting and heating of chemical substances, which comprises:
a flat bottom comprising an upper surface and a lower surface,
a circumferential frame, which together with the flat bottom forms a trough-shaped cavity for receiving the chemical substances, wherein the circumferential frame is connected to the flat bottom in a non-destructively detachable manner,
wherein the circumferential frame comprises a plurality of flat frame sections and a plurality of corner sections that are arranged such that two adjacent flat frame sections are connected to each other by one corner section of the plurality of corner sections, said circumferential frame further comprising a plurality of flanges for attaching the flat bottom to the circumferential frame,
wherein at least one flange of the plurality of flanges is formed at least in part by a lower portion of a flat frame section of the plurality of flat frame sections and/or by a lower portion of a corner section of the plurality of corner sections and said at least one flange having an upper surface and a lower surface and is arranged either (a) at a location of one corner section of the plurality of corner sections such that said at least one flange extends outwardly away from a center of the transport trough and said one corner section is set back inwards towards the center of the transport trough relative to said at least one flange, said at least one flange defining a portion of an outer periphery of the transport trough at the location of said one corner section or (b) along at least part of a length of the flat frame section such that said at least one flange extends inwardly towards the center of the transport trough and the upper surface of said at least one flange supports the lower surface of the flat bottom or (c) along at least part of a length of the flat frame section such that said at least one flange extends outwardly away from a center of the transport trough and said one frame section is set back inwards towards the center of the transport trough relative to said at least one flange.

2. The transport trough according to claim 1, wherein the flat bottom is formed in the form of a one-piece bottom plate.

3. The transport trough according to claim 2, wherein the one-piece bottom plate is clamped to the circumferential frame, wherein said at least one flange that extends outwardly away from the center of the transport trough is an outwardly protruding clamping flange, and wherein at least one clamping element engages the outwardly protruding clamping flange of the circumferential frame.

4. The transport trough according to claim 2, wherein the one-piece bottom plate is screwed to the circumferential frame, wherein said at least one flange that extends inwardly towards the center of the transport trough is an inwardly protruding screw flange, wherein the one-piece bottom plate rests on the inwardly protruding screw flange of the circumferential frame and at least one screw is screwed to the screw flange, wherein the screw engages in a blind hole of the bottom plate.

5. The transport trough according to claim 4, wherein the flat bottom consists of a bottom plate formed from a plurality of strip-shaped bottom plate elements.

6. The transport trough according to claim 5, wherein the bottom plate formed by a plurality of bottom plate elements is clamped to the circumferential frame by at least one clamping strip.

7. The transport trough according to claim 6, wherein said at least one flange that extends inwardly towards the center of the transport trough is an inwardly protruding screw flange, wherein the bottom plate elements rest on the inwardly protruding screw flange of the circumferential frame, wherein the at least one clamping strip is screwed to the inwardly protruding screw flange by at least one screw, wherein the at least one screw engages a blind hole of the at least one clamping strip.

8. The transport trough according to claim 1, wherein the flat bottom is formed multi-part.

9. The transport trough according to claim 8, wherein the flat bottom has an upper bottom plate, which is formed of a plurality of strip-shaped bottom plate elements, wherein the upper bottom plate is arranged on a one-piece lower bottom plate.

10. The transport trough according to claim 9, wherein the one-piece bottom plate, and optionally the upper bottom plate formed from a plurality of bottom plate elements, is clamped to the circumferential frame, wherein said at least one flange that extends outwardly away from the center of the transport trough is an outwardly protruding clamping flange, and wherein at least one clamping element engages the outwardly protruding clamping flange of the frame.

11. The transport trough according to claim 1, wherein the flat bottom and the circumferential frame are made of materials different from one another.

12. The transport trough according to claim 11, wherein the material of the flat bottom is more corrosion resistant than the material of the frame with respect to the chemical conversion of a same product.

13. The transport trough according to claim 1, wherein the flat bottom consists of a material selected from the group consisting of cordierite, mullite, aluminum oxide, zirconium oxide, magnesium oxide, R-SiC, N-SiC, S-SiC, Si-SiC, and mixtures thereof and/or in which the circumferential frame is made of a cordierite/spinel/mullite mixture.

14. The transport trough according to claim 1, wherein the circumferential frame is composed of a plurality of individual parts.

15. A method comprising utilizing a transport trough according to claim 1 for the production of a cathode material for a lithium-ion battery.

* * * * *